United States Patent
Shiina et al.

[11] Patent Number: 5,184,166
[45] Date of Patent: Feb. 2, 1993

[54] SELF-PHOTOGRAPHING METHOD FOR CAMERAS

[75] Inventors: Michihiro Shiina; Yasuhiko Tanaka; Fumio Iwai; Yukio Noguchi; Takao Umetsu; Tatsuo Saito; Haruo Onozuka; Muneyoshi Saitoh; Takao Koda, all of Saitama, Japan

[73] Assignee: Fuji Photo Film Co., Ltd., Kanagawa, Japan

[21] Appl. No.: 634,831

[22] Filed: Dec. 27, 1990

[30] Foreign Application Priority Data

Dec. 28, 1989 [JP] Japan .................................. 1-342460
Jan. 9, 1990 [JP] Japan .................................. 2-2367
Jan. 18, 1990 [JP] Japan .................................. 2-8857
Jan. 18, 1990 [JP] Japan .................................. 2-8858
Jan. 18, 1990 [JP] Japan .................................. 2-8859
Jan. 18, 1990 [JP] Japan .................................. 2-8860
Jan. 30, 1990 [JP] Japan .................................. 2-19986

[51] Int. Cl.$^5$ ............................................ G03B 13/36
[52] U.S. Cl. ................................. 354/400; 354/267.1
[58] Field of Search ............... 354/400, 238.1, 267.1, 354/403

[56] References Cited

U.S. PATENT DOCUMENTS

| 4,908,649 | 3/1990 | Matsui et al. | 354/238.1 |
| 4,998,125 | 3/1991 | Watanabe et al. | 354/403 |
| 5,038,165 | 8/1991 | Amanuma et al. | 354/267.1 |
| 5,047,793 | 9/1991 | Shiomi | 354/238.1 |

Primary Examiner—Russell E. Adams
Attorney, Agent, or Firm—Young & Thompson

[57] ABSTRACT

A self-photographing method for an autofocus camera, wherein, upon depression of a shutter release button, the subject distance data are detected a plurality of times at periodic intervals, and a predetermined exposure operation, that is, an actual shutter release operation is automatically executed using the autofocus system when the detected subject distance data have changed from each other. The distance data are repeatedly detected and compared with each other until these distance data differ from each other. If the distance data have been equal for a predetermined time interval from the shutter release button depression, then the actual shutter release operation is executed, or is called off and the self-photographing is terminated. It is preferred that the detected change of distance be a decrease of distance, indicating that the photographer has stepped into the picture, whereupon the measured distance becomes his distance in place of the background distance.

44 Claims, 13 Drawing Sheets

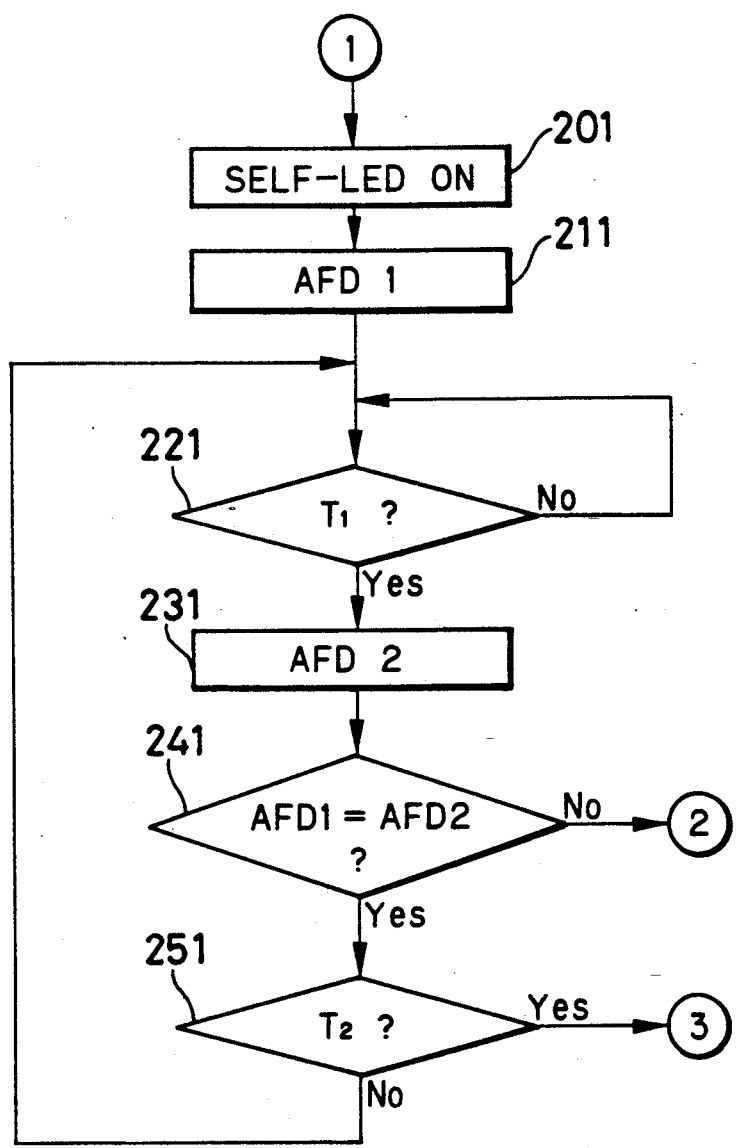

SELF-PHOTOGRAPHING METHOD FOR CAMERAS

BACKGROUND OF THE INVENTION

The present invention relates to a self-photographing method for a camera, especially to a self-photographing method for a camera having an autofocus system.

Generally, a self-timer has been used to give a delay time, e.g. 10 seconds, between the depression of a shutter release button and the actual shutter release operation in self-photography.

It is also known to use a remote control system for self-photography.

However, when self-photography is performed using a self-timer, the photographer must move into a certain target position and pose for a photograph within a predetermined time interval defined by the self-timer. Therefore, he must act rapidly if the self-timer interval is short, while it may be tedious if the interval is long. Furthermore, because conventional autofocus cameras carry out the subject distance measurement upon depression of the shutter release button, it is necessary in self-photography to aim the camera at a subject disposed at the same distance from the camera as a target position in which the main subject such as the photographer is going to pose, and thereafter to re-frame the camera so as to aim at the target position before starting the self timer. This focus-lock operation is quite awkward.

On the other hand, providing a remote control system makes the camera expensive and large in size.

SUMMARY OF THE INVENTION

An object of the invention is to solve the above problem in an otherwise conventional self-photographing method.

To achieve the above object, the present invention comprises effecting automatically an actual shutter release operation upon detecting that the photographer has moved into a certain target position.

According to the self-photographing method for an autofocus camera of the present invention, the subject distance data are detected more than one time at periodic intervals, and a predetermined exposure operation, that is, an actual shutter release operation is automatically executed, using the autofocus system, when the detected subject distance data have changed.

According to a preferred embodiment, the distance data are repeatedly detected and compared with each other until these data differ from each other.

According to a further embodiment, the actual shutter release operation is started at a predetermined time interval, e.g. 3 seconds after the distance data have changed.

The present invention is based on the fact that the distance data detected before and after the photographer has moved into the target position will change from each other except in some cases. Such cases may arise, for example, when a wall or other subject is disposed near the target position, or when the photographer is not exactly in the target area. In such cases, if the actual shutter release operation is not executed unless the change of the distance data is detected, the periodic detection of distance data would continue forever. Therefore, it is necessary to terminate the self-photographing operation when no change of the distance data has been detected for a predetermined time interval.

According to an embodiment of the invention, the self-photographing operation is terminated without executing the actual shutter release operation when no change of the distance data has been detected for a predetermined time interval.

According to another embodiment of the invention, the actual shutter release operation is executed in the self-photographing operation when a predetermined time interval has elapsed even if no change of the distance data has been detected.

In the self-photographing method of the present invention, a predetermined shutter release operation is performed when the camera detects that the photographer has moved into a certain target area, so that he need not move and pose quickly in the target area, nor be kept waiting for the moment of shutter release. Furthermore, there is no need to perform the above-described focus-lock operation before starting the self timer. Because the present invention makes use of the conventional distance measuring device of a built-in autofocus system of a camera, the camera can be produced at a low cost compared with a camera provided with a remote control transmitter-receiver system.

BRIEF DESCRIPTION OF THE DRAWINGS

Other objects and advantages of the invention will become apparent from the following detailed description when read in conjunction with the accompanying drawings, wherein.

DETAILED DESCRIPTION OF THE PREFERRED EMBODIMENTS

Figure 1:
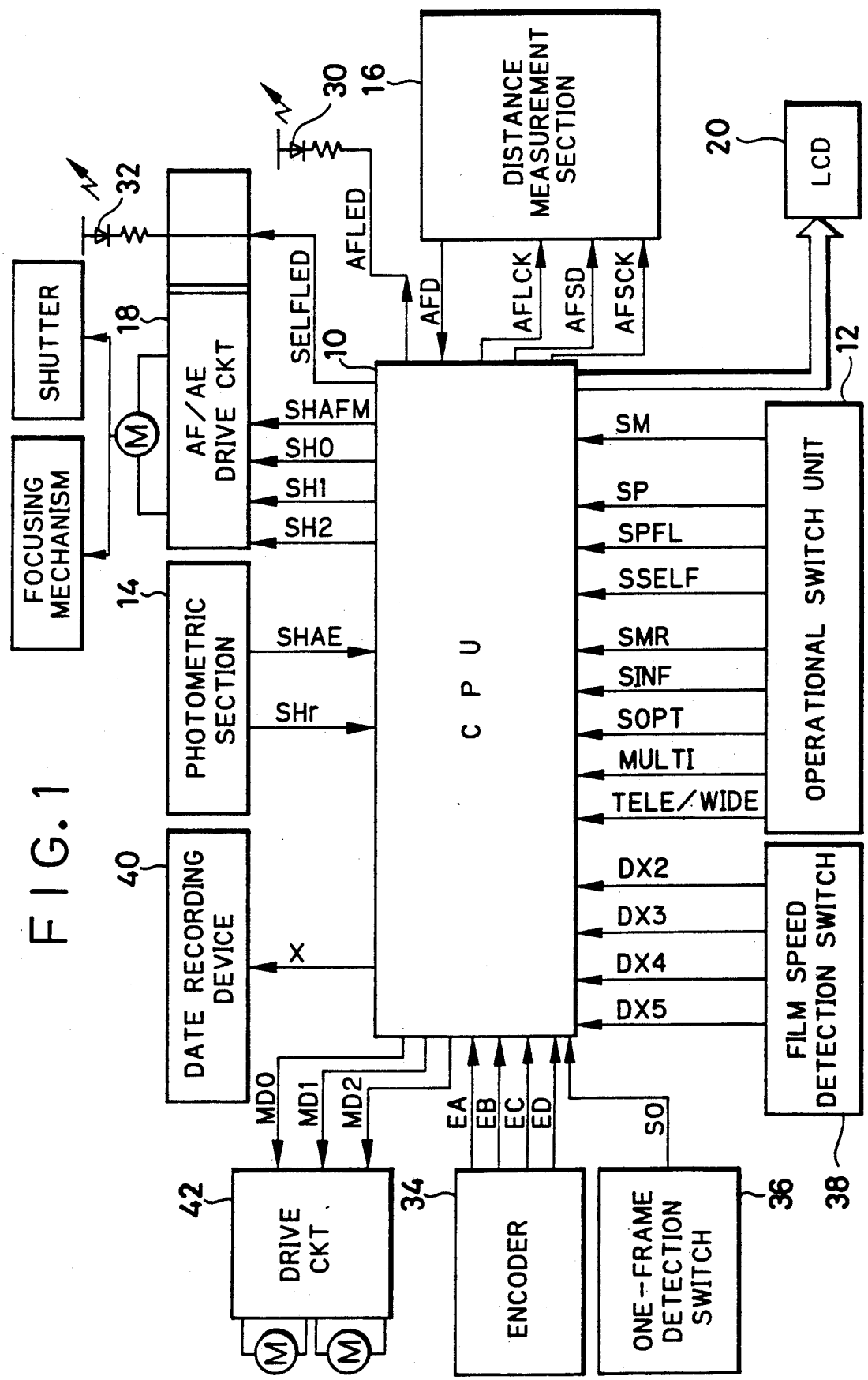
FIG. 1 is a block diagram showing the overall circuitry of a camera embodying the present invention.

FIG. 1 shows schematically an overall circuit of a camera embodying the present invention. As shown in FIG. 1, the circuit comprises a central processing unit (CPU) 10, an operational switch unit 12, a photometric section 14, a distance measurement section 16, an AF/AE drive circuit 18, and a liquid crystal display (LCD) 20.

The operational switch unit 12 includes, for example, a power switch SM, a shutter release switch SP, a self-mode switch SSELF, an optional mode switch SOPT, a multi-self photography switch MULTI, a focus lock switch SPEL, a manual rewinding switch SMR, a tele-/wide-photography switch TELE/WIDE, and an infinity-photography switch SINF. The infinity-photography switch is actuated to set an infinity-photography mode (hereinafter called simply an INF mode) where the focusing position of the taking lens is fixed at infinity independently of the autofocus system so as to be optimum for photographing a landscape and the like. The output signals therefrom are sent to the CPU 10.

The photometric section 14 measures the subject brightness and outputs to CPU 10 brightness data SHAE and data SHr representative of gamma-correction data of photoelectric elements constituting the photometric section 14.

The distance measurement section 16 measures the subject distance by a triangulation system and outputs distance data AFD to the CPU 10. During distance measurement, the CPU 10 outputs a drive signal AFLED to an infrared light emitting diode 30 for driving the same, as well as an AF logic clock signal AFLCK, an AF serial data AFSD and an AF serial clock signal AFSCK to the distance measurement section 16 for driving the same. The infrared light emitting diode 30 can emit three light beams L, C and R or only the single beam C for one measurement in accordance with the drive signal AFLED from the CPU 10. The distance measurement section 16 effects the distance measurement in response to the AF serial data AFSD indicating that the diode 30 emits the multi-beam L, C and R and transfers resulting distance data AFD sequentially to the CPU 10.

The AF/AE drive circuit 18 controls a lens shutter having an electromagnetic shutter blade driven by a stepping motor in response to stepping motor drive signals SH0, SH1 and SH2 from the CPU 10. The AF/AE drive circuit 18 further controls the excitation of an AF magnet in response to the AF magnet drive signal SHAFM, thereby enabling the taking lens to move into a focusing position also in response to the stepping motor drive signals SH0, SH1 and SH2. When the stepping motor and thus the taking lens moves into a predetermined position corresponding to the distance data AFD, the AF magnet is degaussed to enable the shutter blade to move. The stepping motor is further rotated to open the shutter blade, and is started to rotate reversely to close the shutter blade when it reaches a predetermined step position corresponding to the brightness data SHAE. When the stepping motor returns to an initial position, a series of shutter drive operations are terminated.

Figure 2:
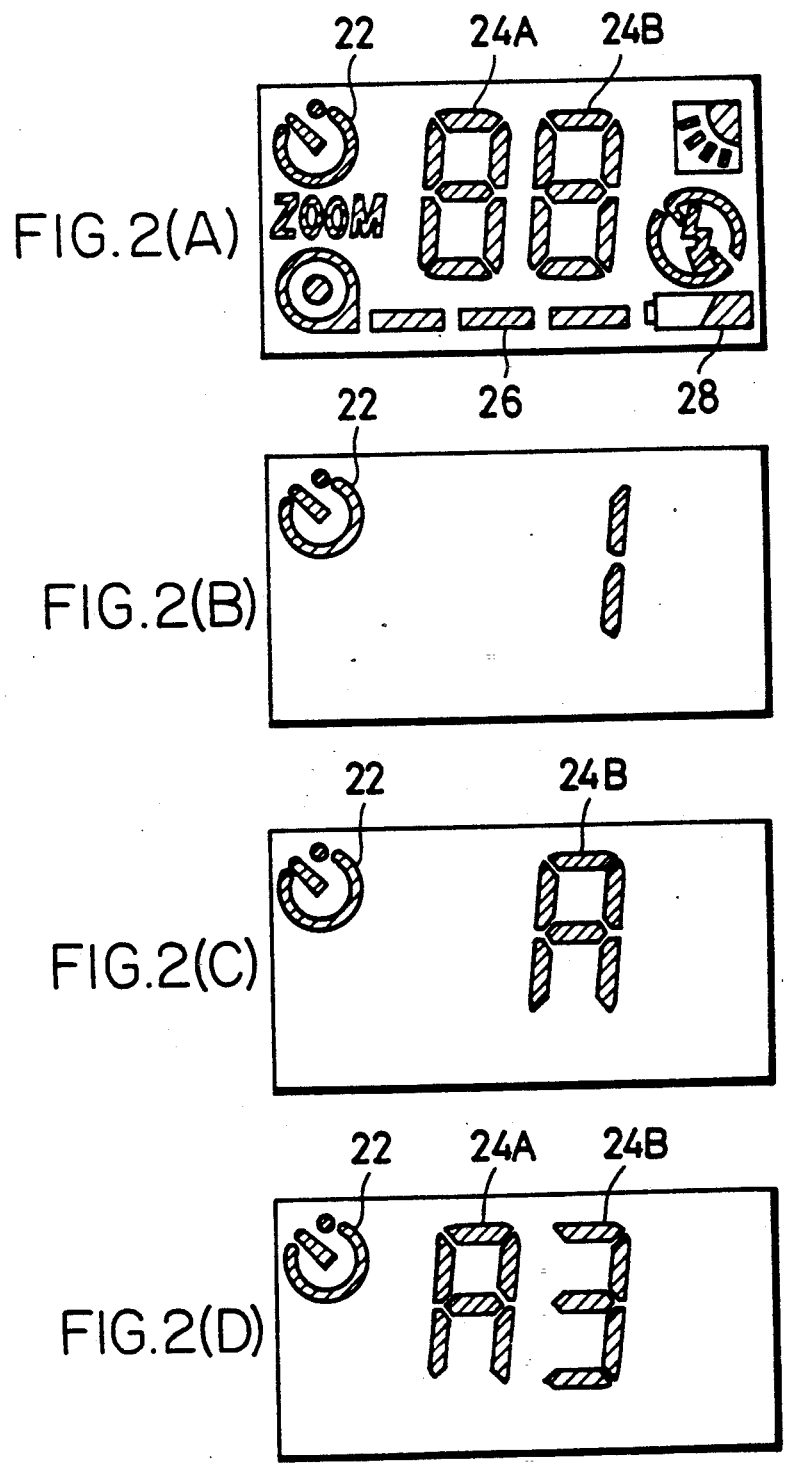
FIGS. 2(A), (B), (C) and (D) show examples of display patterns in a liquid crystal display of the camera.

The LCD 20 comprises, as is shown in FIG. 2(A), a self-timer display segment 22, frame number display segments 24A and 24B, a film advance display segment 26, a battery warning segment 28 and so forth, and displays necessary numbers or marks in response to control signals from the CPU 10. FIG. 2(B) illustrates a display condition indicating a self mode wherein an exposure is executed after a constant delay time following depression of the shutter release switch (hereinafter referred to as a normal self mode). In this normal self mode, the self timer mark 22 is displayed while "1" is displayed in the segment 24B instead of the frame number. FIG. 2(C) illustrates another display condition indicating an auto-self mode related to the present invention, which will be described in detail below. In the auto-self mode, "A" is displayed in the segment 24B together with the self-timer mark 22. FIG. 2(D) illustrates still another display condition indicating a multi-auto-self mode wherein a plurality of frames are automatically exposed during a self photography operation. In the multi-auto-self mode, the self timer mark 22 is displayed while "A" is displayed in the segment 24A and the number of frames to be exposed, "3" for instance, is displayed in the segment 24B.

Referring again to FIG. 1, the CPU 10 outputs a signal SELFLED to a light emitting diode (self LED) 32 in the above-described self modes, so as to control the diode 32 to be on or off for indicating the setting for the self-photography. Furthermore, the CPU 10 is supplied with a four bits signal EA, EB, EC and ED from an encoder 34 which is indicative of a zoom position of the taking lens, and with a signal SO from a one-frame advance detection switch 36 each time the film is advanced by one frame, as well as with a four-bits signal DX2, DX3, DX4 and DX5 from a film speed detection switch 38 which is indicative of the ISO speed of the film. The CPU 10 also outputs a date signal X to a date recording device 40, and a three-bits motor drive signal MD0, MD1 and MD2 to a drive circuit 42 for driving a zoom motor and a film transporting motor.

The above-described camera can operate not only in the above-described various self modes, but also in a standard photography mode as well as in a tele- or wide-photography mode, in an infinity photography mode wherein the taking lens is always moved into a specific position irrespective of the distance data AFD, or in any other mode. However, the operation of the camera as set forth below is described for the auto-self mode.

Figure 3:
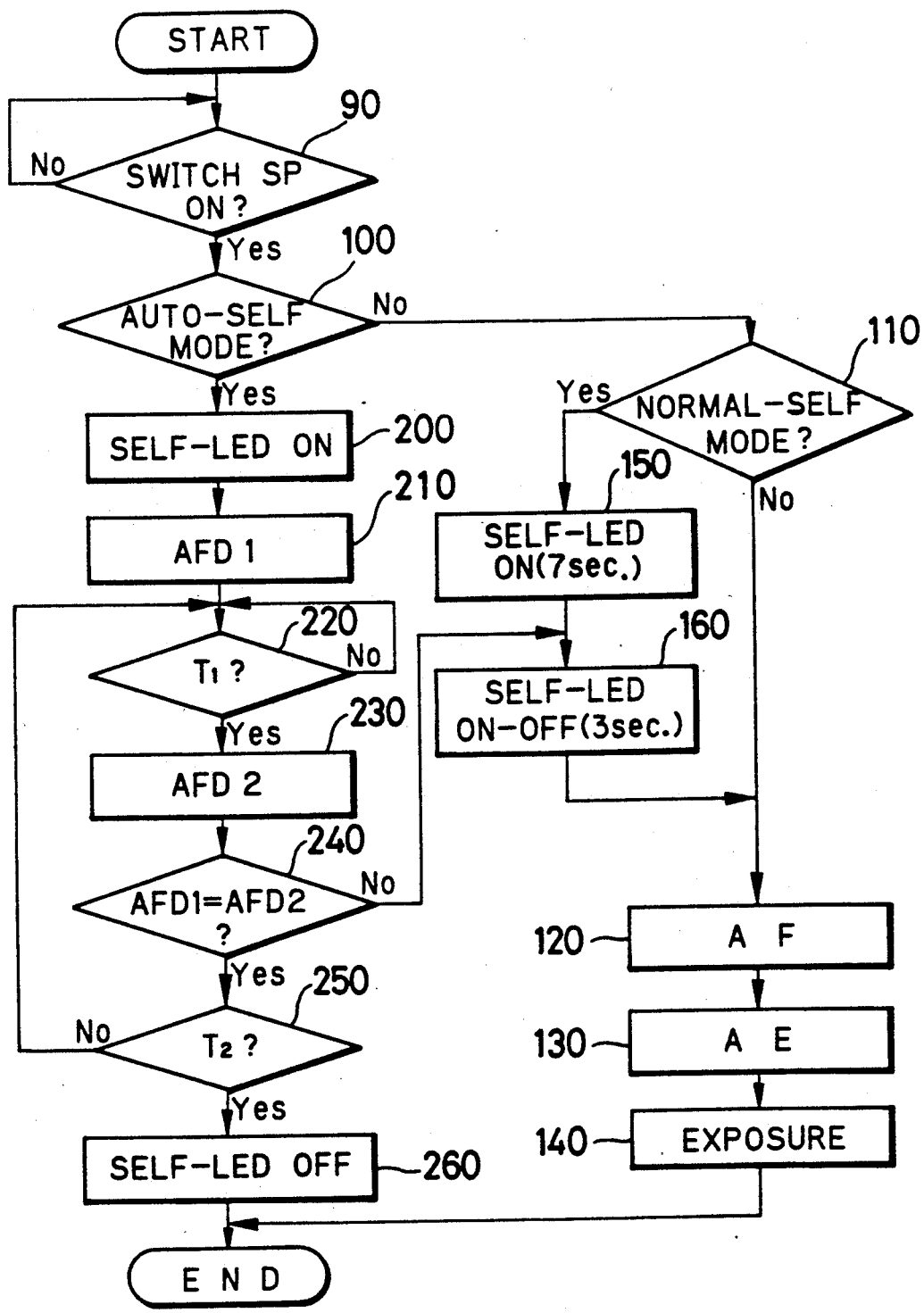
FIG. 3 is a flow chart of the sequence of self-photographing according to a first embodiment of the invention.

Referring to FIG. 3 there is shown a flow chart of a main program of a first embodiment of the invention, wherein when the power switch SM of the camera is turned on and the shutter release switch SP is actuated (step 90), the CPU 10 always executes the following program:

First, it is determined whether the camera is set in the auto-self mode (step 100). If not, that is, the option mode switch has not been actuated as to set the auto-self mode before the depression of the shutter release switch SP, then it is determined whether the camera is set in the normal self mode (step 110). Also the normal self mode is set manually by actuating the self mode switch SSELF before the depression of the shutter release switch SP.

If it is judged in step 110 that the normal self mode has not been set, then standard photography is performed, wherein the CPU 10 receives distance data AFD from,, the measuring section 16 as well as data SHAE and SH, from the photometric section 14 (steps 120 and 130) so that the CPU 10 outputs stepping motor drive signals SH0, SH1 and SH2 and the AF magnet drive signal to the AF/AE drive circuit 18 in a manner as described above for these input data, thereby performing an exposure (step 140) and terminating a photographing operation.

On the other hand, if it is judged in the step 110 that the normal self mode is set, then the self LED 32 is energized to emit light continuously for 7 seconds (step 150) and to flash on and off for 3 seconds (step 160). Accordingly, a photograph is taken by the steps 120, 130 and 140 in the same way as above, but 10 seconds after the shutter release switch SP has been depressed.

In a case wherein it is determined in step 100 that the auto-self mode has been set, the self LED 32 emits light continuously (step 200), and the distance measuring section 16 detects first distance data AFD1 at the time of depression of the shutter release switch SP, which data are input to the CPU 10 and are stored therein (step 210).

Next, a constant time interval T1, e.g. 0.5 second, is clocked and, when the time interval T1 has elapsed, the distance measuring section 16 is caused to detect second distance data AFD2 and sends these data to the CPU 10 (step 230). The CPU 10 compares the second distance data AFD2 with the stored first distance data AFD1 (step 240).

If both distance data AFD1 and AFD2 are equal, it is determined whether a constant time interval T2, e.g. 30 seconds, has elapsed following the depression of the shutter release switch SP, and if not, the process goes back to the above step 220. In this way, second distance data AFD2 are repeatedly detected and are compared with the stored first distance data AFD1 at T1 intervals within the time interval T2.

When the second distance data change and thus differ from the first distance data, it can be assumed that the operator of the camera has moved in a predetermined area of the photographing field. Thereafter, the process proceeds from step 240 to step 160, thereby causing the self LED 32 to flash on and off for 3 seconds and thereafter an exposure is effected by way of the steps 120, 130 and 140.

When the time interval T2 has elapsed, that is, data AFD1 and AFD2 remain equal within the time interval T2, the self LED 32 is turned off (step 260) and the camera ends this auto-self mode operation.

Meanwhile, as described above, there are provided many functional switches in the camera. If the SINF switch is actuated to set the INF mode, because the INF mode contradicts the auto-self mode, it is necessary to give priority to either one of these two modes, and preferably give priority to the auto-self mode over the INF mode. Subroutines for this purpose will be described with reference to FIGS. 4 and 5.

The CPU 10 starts operation upon the power switch SM of the camera being turned on, and sequentially reads and checks the input signals from all switches in the operational switch unit 12 at a high speed so as to execute an operation selected by means of the switches.

Figure 4:
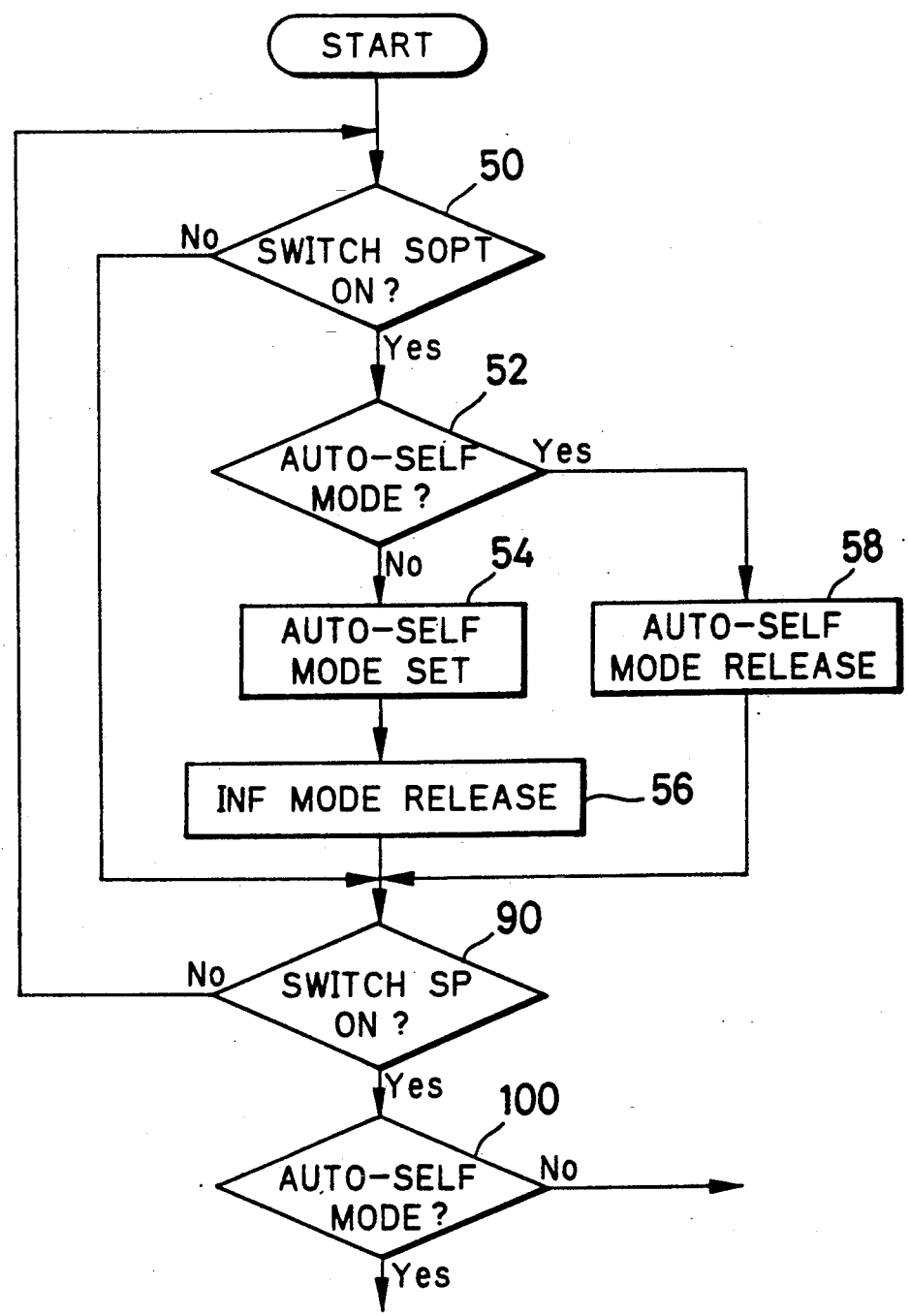
FIG. 4 is a flow chart of a first sub-routine for setting a control mode before starting the sequence of FIG. 3.

With respect to the option mode switch SOPT, the CPU 10 firstly determines whether the switch SOPT is turned on (step 50), as is shown in FIG. 4. If not, then the subroutine returns to the main routine as shown in FIG. 3. If the option mode switch SOPT is turned on, that is, when the switch SOPT is depressed, then the process proceeds to the step 52. It is to be noted that the switch SOPT is a non-locked pushbutton switch wherein the signal condition changes upon depression of the switch button.

In the step 52, it is determined whether the present mode is the auto-self mode. If not, the auto-self mode is set (step 54) and the INF mode is released (step 56) irrespective of whether the INF mode is set at present. On the other hand if the auto-self mode is set, then the auto-self mode is released (step 58). In other words, one depression of the switch SOPT will set the auto-self mode and release the INF mode if the auto-self mode has not been set, whereas one depression of the switch SOPT will release the auto-self mode if the auto-self mode has been set.

Figure 5:
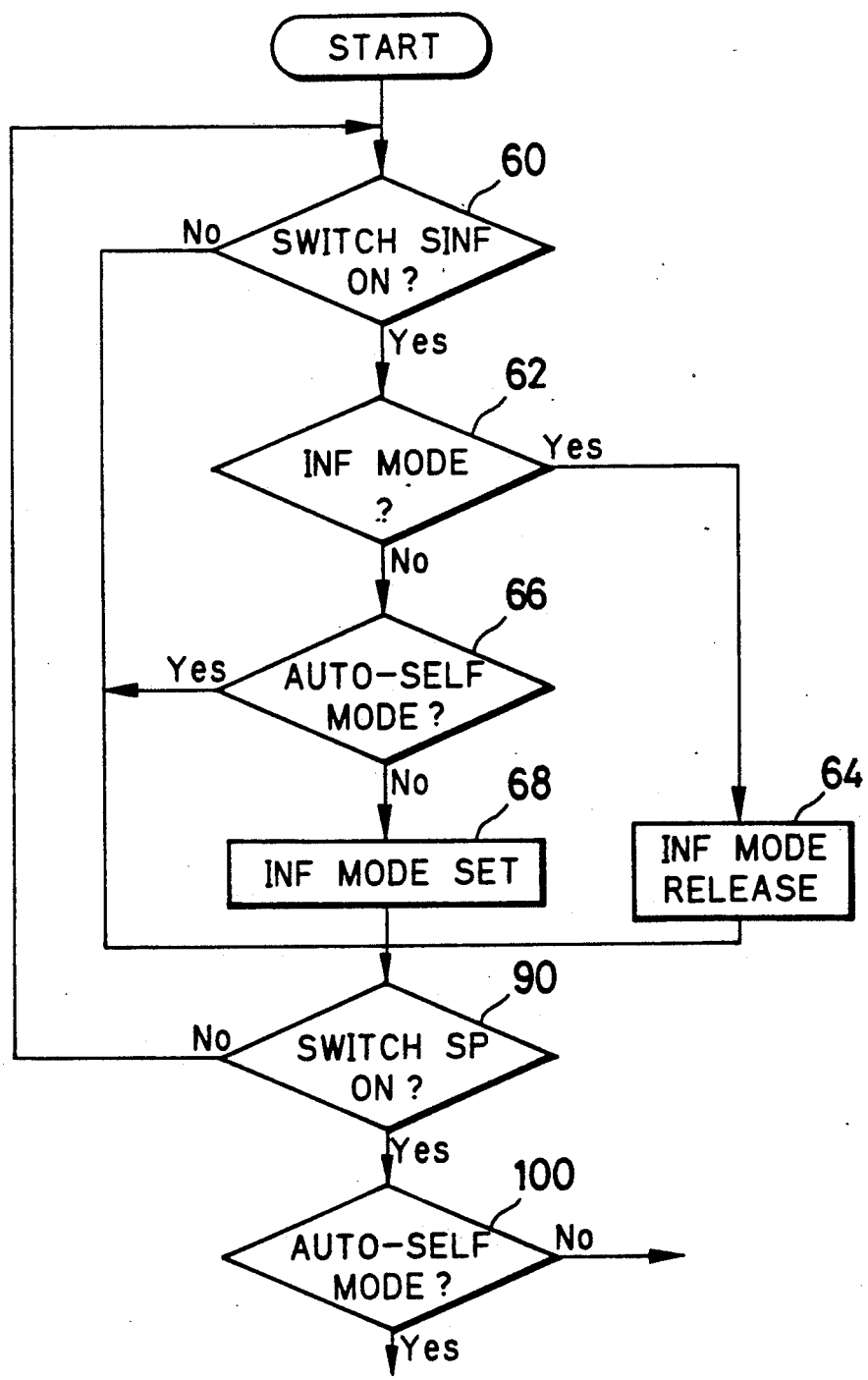
FIG. 5 is a flow chart of a second sub-routine for setting a control mode before starting the sequence of FIG. 3.

Referring now to FIG. 5, the CPU 10 also determines whether the infinity-photography switch SINF is turned on (step 60), and if not, the process proceeds to the step 90 of the main program, whereupon the subroutine of FIG. 5 is repeated. It is to be noted that the infinity-photography switch SINF is a pushbutton switch as is also the switch SOPT. If the switch SINF is turned on, then it is determined in the step 62 whether the INF mode is set at present. If the INF mode has been set, the INF mode is released upon one depression of the switch SINF (step 64), but if the INF mode has not been set, then it is determined whether the auto-self mode has been set (step 66). In case of the auto-self mode, the INF mode is not executed, but instead the process proceeds to the step 90. Accordingly, the INF mode is set upon one depression of the infinity-photographing switch SINF only when neither the INF mode nor the auto-self mode has been set (step 68).

In this way, since the auto-self mode is given priority over the INF mode, an erroneous operation is prevented even if the auto-self mode is selected when the INF mode has been set, or if the INF mode is selected when the auto-self mode has been set.

As was briefly described with reference to FIG. 1, in the camera of this embodiment, the infrared light emitting diode 30 can alternatively emit three light beams L, C or R toward different subject points in a brightness measurement mode (hereinafter referred to as a multi-beam mode) or the light beam C alone can be directed toward a subject point in another brightness measurement mode (hereinafter referred to as a single-beam mode). In the multi-beam mode, the distances to the different subject points are detected and the nearest distance thereof is adopted to determine focussing. The single-beam mode is advantageous when photographing a pinpoint subject, while the multi-beam mode is advantageous when photographing more than one person arranged side by side, because the single beam may travel between the two adjacent persons toward the background, thereby resulting in an erroneous focussing based on the detected distance to the background.

Also in the auto-self mode, it may be preferable to select the single-beam mode in one case, but the multi-beam mode may be preferable in another case. For example, if the multi-beam mode is selected concurrently with the auto-self mode when there are other people than the photographer to be photographed within a photographic field, it may be possible that the camera will make an exposure before the photographer moves into the target area because other people tend to move within the broad target area covered by the multi-beam measurement. Therefore, it is preferable to select the single-beam mode in such a case. On the other hand, because the target area covered by the signal-beam measurement is narrow, it is somewhat difficult for the photographer to move exactly into that area. Therefore, it may be preferable to select the multi-beam mode except for the preceding case.

Figure 6:
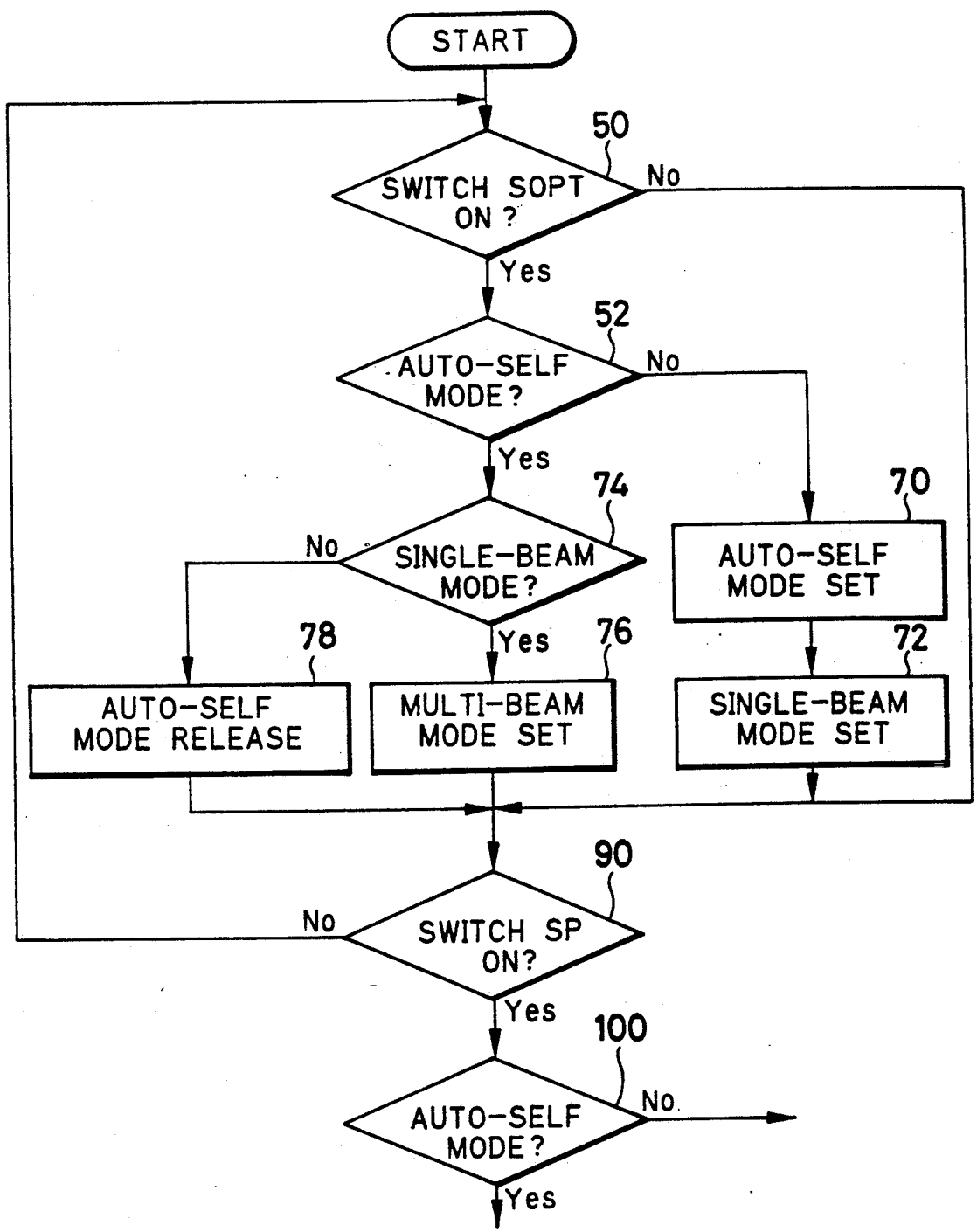
FIG. 6 is a flow chart of a third sub-routine for setting a control mode before starting the sequence of FIG. 3.

So as to make it possible optionally to select the single-beam mode or the multi-beam mode in self-photography, the present invention provides a third subroutine as shown in FIG. 6, wherein when it is determined in the step 50 that the switch SOPT is depressed and is turned on, then it is determined in the step 52 whether the auto-self mode is set at present. If not, the auto-self mode is set and, at the same time, the single-beam mode is set (steps 70 and 72). If the auto-self mode is already set, then it is determined whether the single-beam mode has been set (step 74). If the single-beam mode is already set, then the single-beam mode is released and the multi-beam mode is set (step 76). If it is determined in the step 74 that the multi-beam mode is set at present, then the auto-self mode is released (step 78). Unless the optional mode switch SOPT is depressed, or after the step 72, 76 or 78, the process proceeds to the step 90. If the shutter release switch SP is not turned on, the subroutine of FIG. 6 is repeated.

Consequently, if the switch SOPT is depressed once when the auto-self mode has not been set, then the auto-self mode is set concurrently with the single-beam mode (single-beam auto-self mode). If the switch SOPT is again depressed in this condition, then the multi-beam mode is set so that the auto-self mode photography may be performed based on the multi-beam measurement (multi-beam auto-self mode). If, thereafter, the switch SOPT is depressed once again, then the auto-self mode is released.

According to a third subroutine of FIG. 6, it is possible to select the single-beam mode or multi-beam mode in the auto-self mode by operating the option mode switch SOPT alone.

Although the preceding embodiment uses a single switch to select the single-beam auto-self mode or the multi-beam auto-self mode, as well as to release the auto-self mode, it is, of course, possible to provide individual switches for setting and releasing the auto-self mode and for switching over between the single- and multi-beam mode.

Figure 7A:
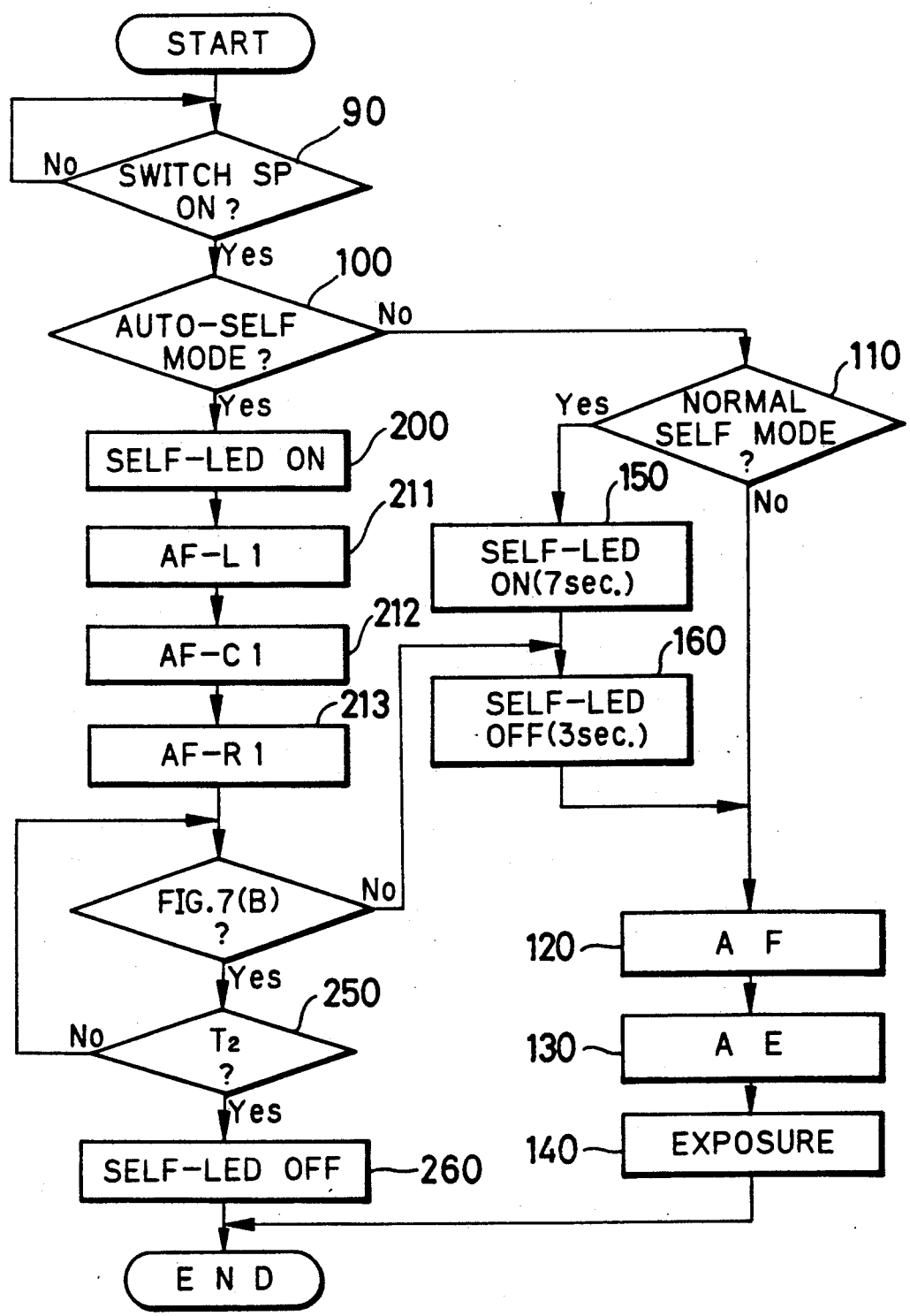
FIGS. 7(A) and (B) show a flow chart of a sequence for self-photographing according to a second embodiment of the invention.
Figure 7B:
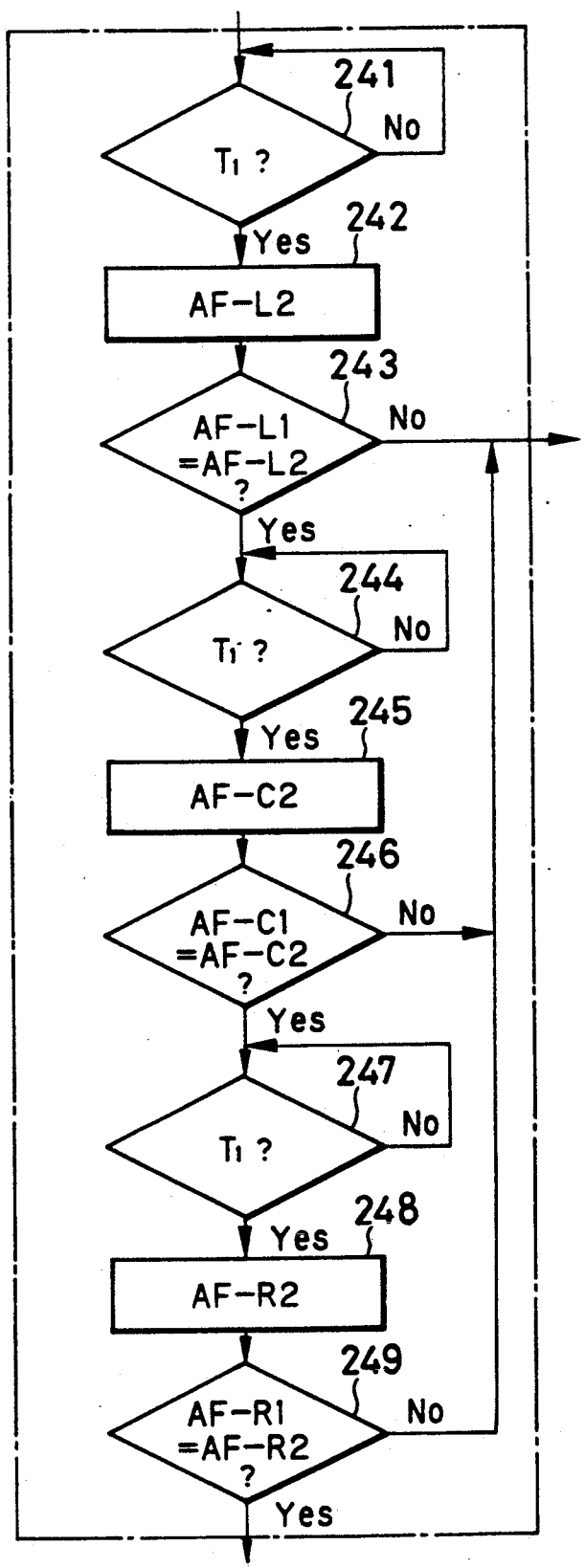

FIGS. 7(A) and 7(B) show a flow chart of a sequence for executing the multi-beam auto-self photography wherein a first distance datum is detected corresponding to each of the three light beams, and a second distance datum is sequentially detected by emitting the light beams one after another and is compared with the corresponding first distance datum each time the second distance datum is detected. It is to be noted that like steps are designated by the same reference numerals as in the flow chart of FIG. 3.

Specifically, assuming that the multi-beam auto-self mode is set in step 100, the CPU 10 firstly energizes the self LED 32 to emit light continuously (step 200) and, at the same time, activates the distance measuring section 16 to perform distance measurement in the multi-beam mode. That is, the infrared light emitting diode 30 is driven to emit three light beams L, C and R toward three different subject points, and the distance measuring section 16 detects a first distance datum AF-L1, AF-C1, AF-R1 corresponding to each light beam L, C, R. These first distance data are stored in the CPU (steps 211, 212, 213).

Next, it is determined whether any of the distance data based on the three light beams differs from the corresponding first distance datum, in a manner as shown in FIG. 7(B).

Namely, when the constant time interval T1, e.g. 0.5 second, has elapsed, the light beam L is projected and the distance measuring section 16 detects a second distance datum AF-L2 corresponding to this light beam L (steps 241 and 242). In the next step 243, the second distance datum AF-L2 is compared with the corresponding first distance datum AF-L1.

If the data AF-L1 and AF-L2 are equal, then the next light beam C is projected when the constant time interval T1 has further elapsed. On the basis of this light beam C, a second distance datum AF-C2 is detected and compared with the corresponding first distance datum AF-C1 (steps 244, 245, 246).

If the data AF-C1 and AF-C2 are also equal to each other, then the light beam R is projected after the constant time interval T1, and a second distance datum AF-R2 is detected and compared with the corresponding first distance datum AF-R1 in the same way as above (steps 247, 248, 249).

If the data AF-R1 and AF-R2 are also equal to each other, the step 250 of FIG. 7(A) is executed so as to determine whether the predetermined constant time interval T2, e.g. 30 seconds, has elapsed since the shutter release switch was turned on. Until the time interval T2 has elapsed, the above processes 241 to 249 are repeatedly executed.

On the other hand, if it is determined in any of the steps 243, 246 or 249 that the second distance datum differs from the corresponding stored first distance datum, then it is judged that the photographer has moved into a certain target area, so that the CPU 10 causes the self LED 32 to start flashing on and off for 3 seconds (step 160), and takes a photograph according to the above-described sequence 120 to 140.

If none of the second distance data has changed from the corresponding first distance data within the time interval T2, then the self LED 32 is turned off (step 260) without completing the auto-self photographing. Thus, the camera ceases operation in this case.

Although the number of the emissions from the infrared light emitting diode necessarily increases in the multi-beam auto-self mode compared with the single-beam auto-self mode or the multi-beam normal self mode, this embodiment will reduce the number of the infrared light emissions to the minimum in the multi-beam auto-self mode, thereby prolonging the life of the light emitting elements.

Next will be described further embodiments of the present invention wherein a plurality of pictures can be taken in a self-photography operation (hereinafter referred to as a multi-self mode) with reference to FIGS. 8 to 10, wherein like steps are designated by the same reference numerals, and thus the detailed description of the like steps is omitted so as to avoid redundancy.

Figure 8:
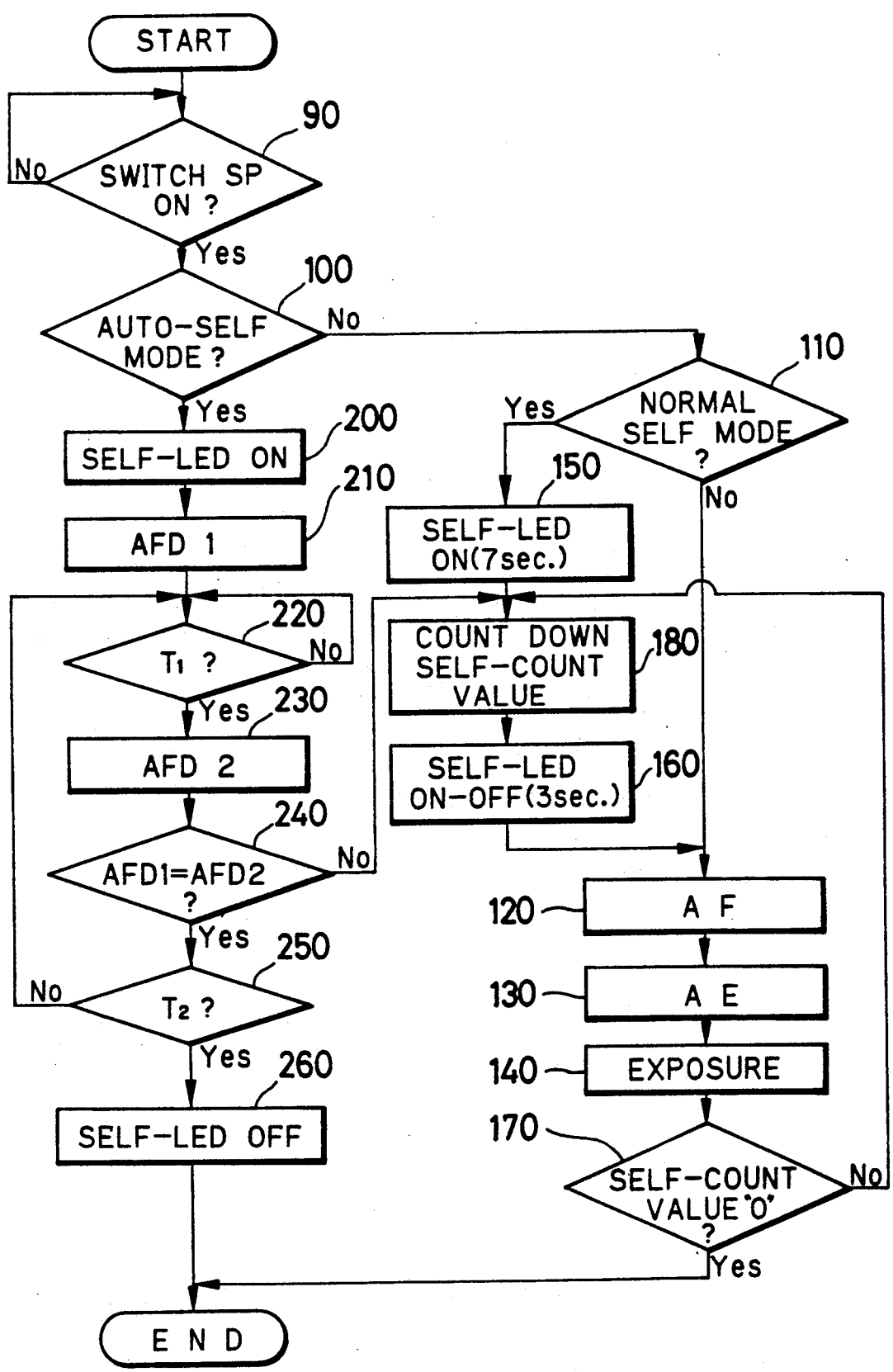
FIG. 8 is a flow chart of a sequence for self-photographing according to a third embodiment of the invention.

In FIG. 8, it is judged before terminating the program sequence whether a self-count value is "0" (step 170). It is to be noted that the self-count value is previously set by means of the multi-self photography switch MULTI in the switch unit 12, if necessary. And when, for example, the self-count value is set at "3" in the multi-auto-self mode, the LCD 20 displays as shown in FIG. 2(D). The self-count value is automatically set at "1" when the number of exposures is not set in a self-mode, whereas it is set at "0" in other modes than the self mode.

Consequently, when the self mode is not selected, and thus the self-count value is "0", the program sequence shown in FIG. 8 is terminated after executing the steps 110, 120, 130, 140 and 170.

If, on the other hand, the normal self mode is selected, then the self LED 150 is energized to emit light for 7 seconds (step 150), and the self-count value is counted down by one count (steps 180). Thereafter the self LED 32 is caused to flash on and off for 3 seconds (step 160), so that an exposure is executed 10 seconds after the depression of the shutter release switch SP, in the same way as above through steps 120, 130 and 140.

Then, it is determined in the step 170 whether the self-count is "0". If not, that is, when the number of exposures is initially set at "2" or "3", then the process goes back to the step 180 wherein the self-count value is counted down by one count. Thereafter, the second exposure is executed in the same way as above, and the same procedure is repeated until the self-count value has fallen to zero.

In the auto-self mode, when the second distance datum AFD2 differs from the first distance datum AFD1, then it is considered that the photographer has moved into a certain target position, so that the process proceeds from the step 240 to the step 180 wherein the self-count value is counted down by one count. And, after the self LED 32 flashed on and off for 3 seconds, the steps 120, 130 and 140 are executed. If it is determined in the step 170 that the self-count value is zero, then the program sequence of this mode is terminated. If not, the process goes back to the step 180, so that the next exposure is executed after counting down the self-count value by one count, in the same way as in the normal self mode.

Accordingly, in the multi-auto-self mode of this embodiment, the first exposure is executed after the self LED 32 flashes on and off for 3 seconds from the time when the distance data have changed, but the following exposures are executed at intervals of 3 seconds, during which the self LED 32 flashes on and off, until the selected number of shots has been completed.

Figure 9:
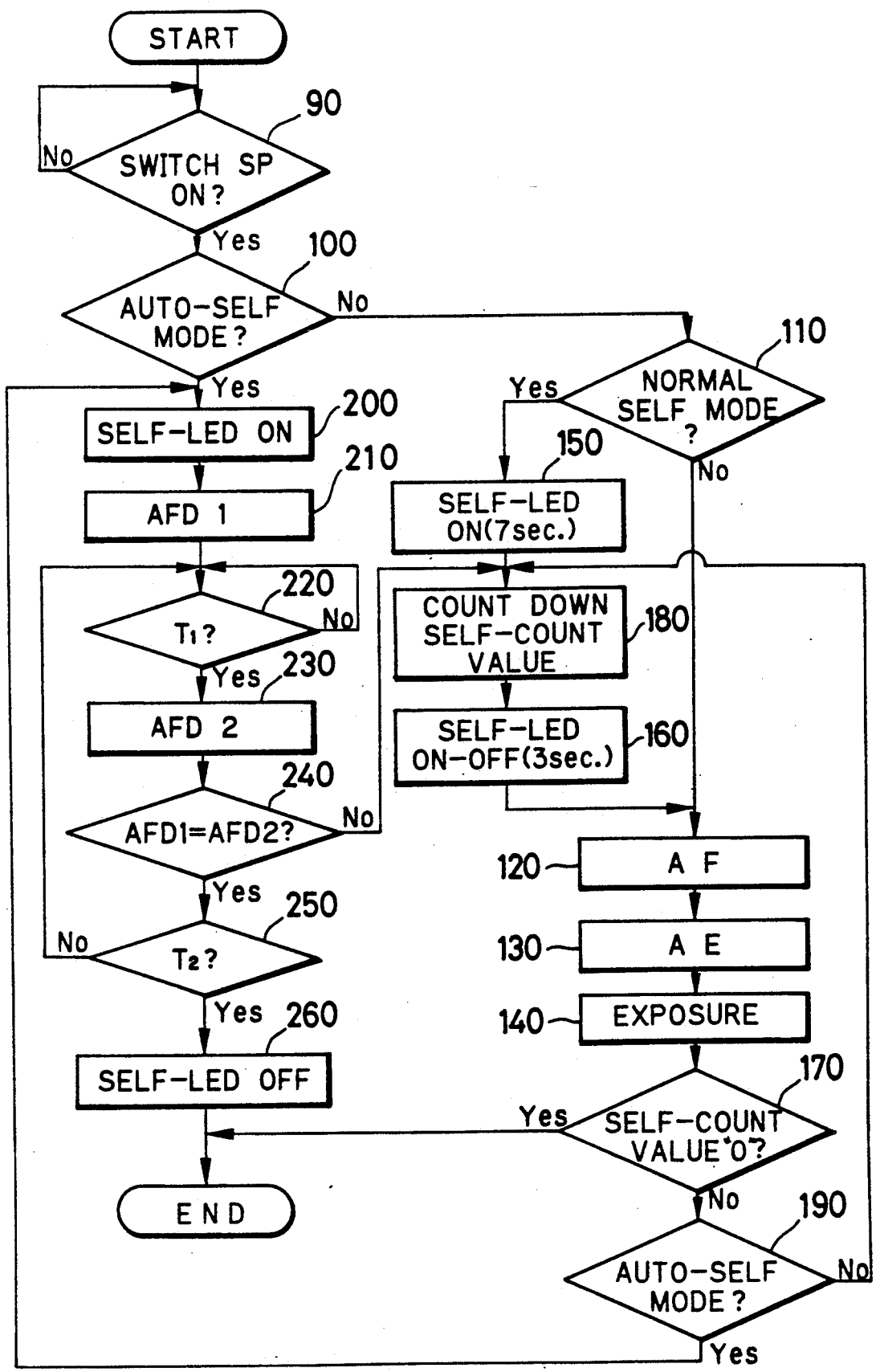
FIG. 9 is a flow chart of a sequence for self-photographing according to a fourth embodiment of the invention.

Referring now to FIG. 9, there is shown another program sequence wherein the second and following exposures as well as the first are executed in the multi-auto-self mode 3 seconds after the distance datum has changed.

As shown in FIG. 9, if it is determined in the step 170 that the self-count value is not "0", then the process proceeds to the step 190 wherein it is determined whether the present mode is the auto-self mode (multi-auto-self mode) or the normal self mode (multi-normal self mode). In case of the normal self mode, the following selected number of exposures are executed at constant time intervals, each after the self-count value is counted down by one count in the step 180, as in the preceding embodiment shown in FIG. 8.

If, on the other hand, the present mode is the auto-self mode, then the process goes back to the step 200, so that the second and following exposures are executed in the same ways as for the first, that is, 3 seconds after the first and second distance data have been determined to differ from each other, those data being detected for each exposure. It is to be noted that the multi-auto-self mode of this embodiment is adapted to such a case wherein the person to be photographed changes his position (that is, his distance) relative to the camera within a target area for each exposure.

Figure 10A:
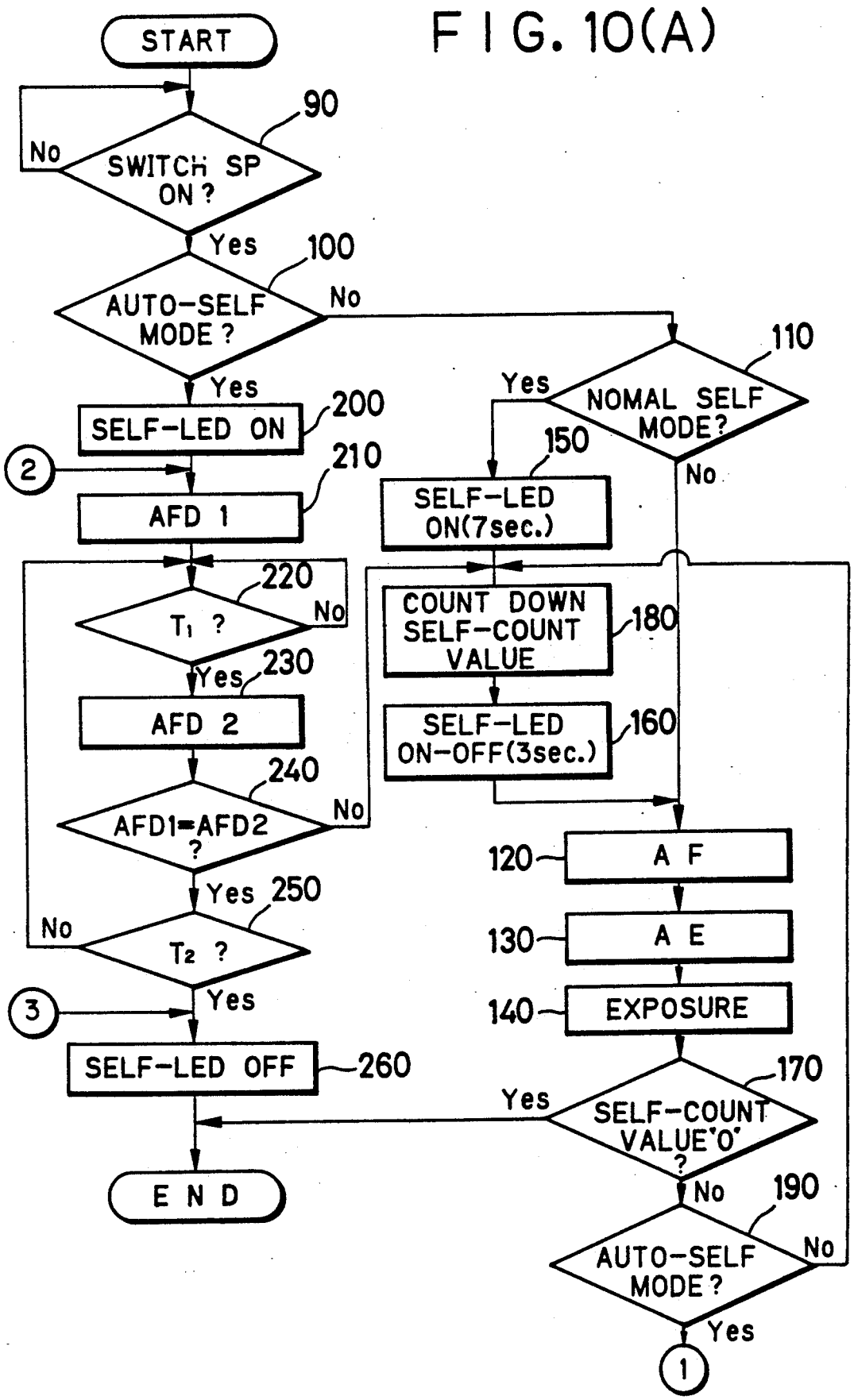
FIGS. 10(A) and (B) show a flow chart of a sequence for self-photographing according to a fifth embodiment of the invention.

According to a further embodiment shown in FIGS. 10(A) and 10(B), the second and following exposures are executed at a predetermined time interval after the detected distance datum has changed twice.

Specifically, if it is determined in the step 190 that the auto-self mode (multi-auto-self mode) is set at present, then the process proceeds to the step 201 as shown in FIG. 10(B). In the steps 201, 211, 221, 231, 241 and 251, the same programs as in the steps 200, 210, 220, 230, 240 and 250 are executed, respectively, so as periodically to check the change of the subject distance within the time interval T2. Therefore, detailed description of these steps 201 et seq. is omitted.

If a change of the subject distance is detected in the step 241 of FIG. 10(B), then the process goes back to the step 210 of FIG. 10(A) so as to execute the same program as for the first exposure. In this way, because the second and following exposures are performed after performing the steps 201 to 241 of FIG. 10(B) as well as the steps 210 to 240, the second and following exposures are made at a predetermined time interval, i.e. 3 seconds after the distance datum has changed twice, although the first exposure is made when the distance data has changed once, but three seconds after that time. This embodiment is adapted to the case wherein the person to be taken moves out of the target area after each shot and then moves back into the target area.

Although the change of the distance data is detected by checking whether a later detected distance datum differs from a previously detected distance datum in the foregoing embodiments, it is possible to detect only such a change of distance data wherein the later detected distance datum indicates a nearer distance than the first distance datum. This is based on the premise that the change of the distance data which is an indication of the main subject having moved into a target area, will always manifest itself as a decrease in subject distance.

Figure 11:
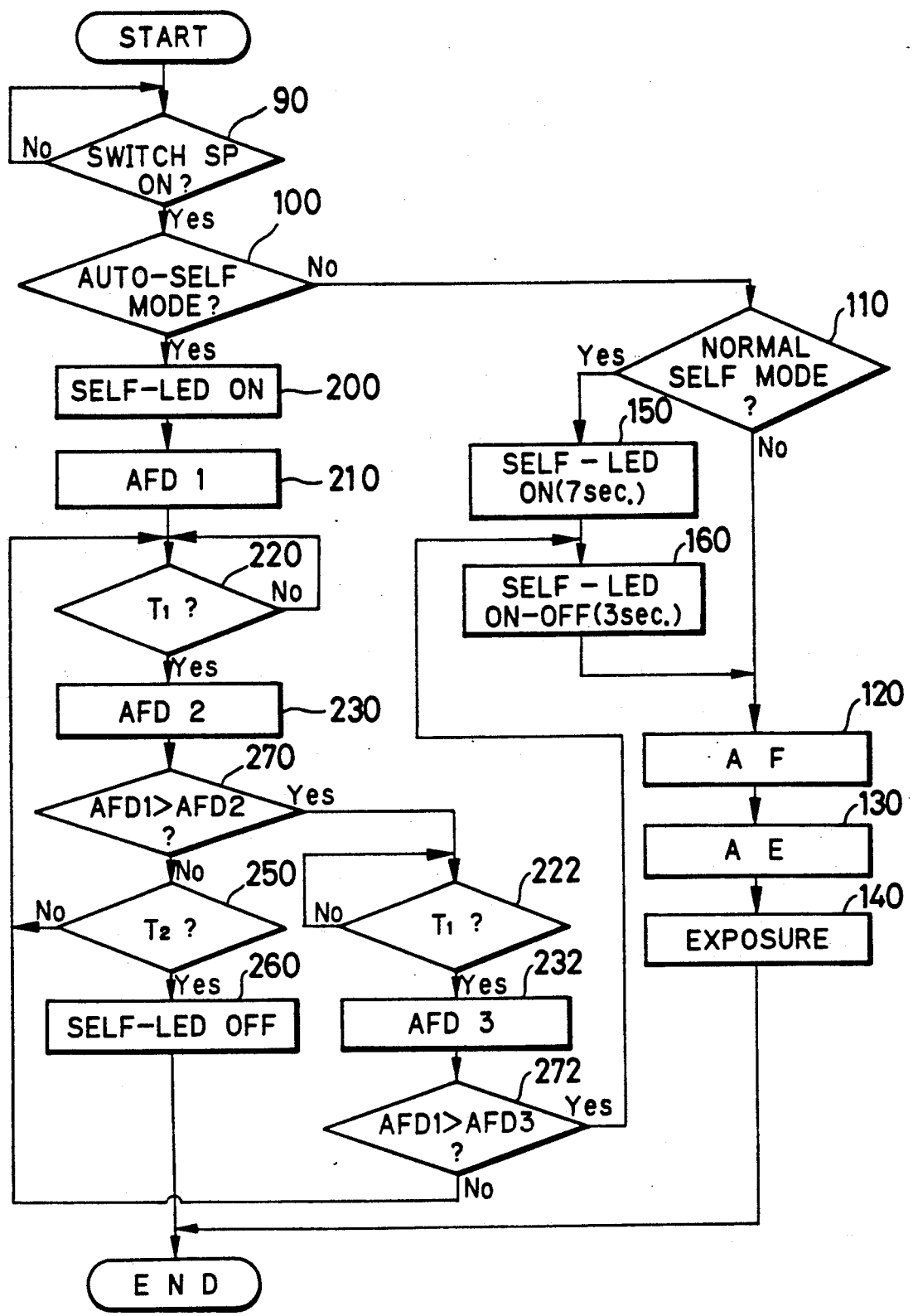
FIG. 11 is a flow chart of a sequence for self-photographing according to a sixth embodiment of the invention.

Such an alternative is shown in FIG. 11, wherein the step 240 of the foregoing embodiments is replaced by the step 270 in which it is determined whether the second distance datum AFD2 represents a nearer distance than the first distance datum. In this embodiment, however, the step 270 proceeds to the step 250 in case of "no". Until the later-detected distance datum becomes less than the first distance datum or until the predetermined time interval T2, e.g. 30 seconds has elapsed, the above process is repeated at a constant time interval T1.

When the second distance datum becomes less than the first distance datum within the time interval T2, the step 270 may directly proceed to the step 160. But it is also possible to provide further steps 222, 232 and 272 before proceeding to the step 160, which further steps correspond to the steps 220, 230 and 270, respectively, so as to confirm that the later-detected distance datum is indeed less than the first distance datum. If not, then it is judged that the distance datum AFD2 detected in the preceding step 230 is an erroneous datum caused by noises such as interference, so that the process goes back to the step 220.

If, on the other hand, the distance datum AFD3 detected in the step 232 is indeed less than the distance datum AFD1 in the step 272, it means that the last two distance data are less than the first distance datum, whereupon it is judged that the main subject, namely the photographer, has indeed moved into a certain target area, so that the sequence proceeds from the step 272 to the step 160 and the following steps 120, 130 and 140 are executed in the same way as above.

If the successive two or more distance data are not less than the distance datum AFD1 within the time interval T2, then the self-LED 32 is turned off and the camera operation ends.

According to this embodiment, since the exposure is not executed unless it is successively twice determined that the subject distance has changed compared with the first distance datum, the exposure will not be effected based on an erroneous distance datum resulting from, say, a noise. Of course, it is possible to compare the first distance datum with a later-detected distance datum more than twice before executing an exposure.

Although according to the foregoing embodiments the camera is adapted to cease operation when a predetermined time interval has elapsed without a change of distance data in an auto-self mode, the user might misunderstand whether the camera operates in this case. To avoid such a misunderstanding, it is possible to provide for the execution of auto-self photographing when a predetermined time interval has elapsed even if the subsequent distance data do not change from the first distance datum. According to this modification of the invention, the camera will always operate even in an auto-self mode. Such a possible case wherein the distance data will not change can arise for example when the photographer stands before a wall or is outside of a certain target area.

Although the invention has been described in detail above with reference to preferred embodiments, various modifications within the scope and spirit of the invention will be apparent to persons skilled in this technological field. For example, the subroutines as shown in FIGS. 4 to 6 may be applicable to all the above embodiments shown in FIGS. 7 to 11 as well as to the first embodiment of FIG. 3. Furthermore, the above embodiments can be adopted not only independently but also in combination with a camera. Thus, the invention should be considered as being limited only by the scope of the appended claims.

What is claimed is:

1. A self-photographing method for a camera with a self-photographing mode, comprising the steps of:
    setting a self-photographing mode in the camera;
    actuating a switch means on the camera thereby to start a self-photographing operation of the camera;
    measuring a subject distance at the beginning of said operation;
    storing in the camera a first distance datum corresponding to said subject distance;
    detecting second distance data of the same subject point as for the first distance datum at periodic intervals after storing said first distance datum;
    comparing said first and second distance data to determine whether said distance data differ from each other;
    executing an exposure operation of film in the camera when said first and second distance data differ from each other;
    wherein said self-photographing mode is terminated before said predetermined exposure operation when said second distance data have been equal to said first distance datum throughout a predetermined time interval.

2. A self-photographing method as defined in claim 1, wherein said second distance data are detected and compared with said first distance datum at periodic intervals until a said second distance datum differs from said first distance 3. A self-photographing method as defined in claim 2, wherein said predetermined exposure operation is executed also when said second distance data have been equal to said first distance datum throughout a predetermined time interval.

4. A self-photographing method as defined in claim 1, wherein said predetermined exposure operation is executed only when a said second distance datum represents a nearer distance than said first distance datum.

5. A self-photographing method as defined in claim 1, wherein said predetermined exposure operation is started at a predetermined time interval after said second distance datum has changed from said first distance datum.

6. A self-photographing method as defined in claim 1, wherein a third distance datum of the same subject point as for said first and second distance data is detected when said second distance datum has changed from said first distance datum, and said predetermined exposure operation is started only when said third distance datum is not equal to said first distance datum.

7. A self-photographing method as defined in claim 1, further comprising the steps of:
    setting in the camera the number of the pictures to be taken in a self-photographing operation before starting said self-photographing operation; and
    determining whether said set number of pictures have been taken after each exposure operation.

8. A self-photographing method as defined in claim 7, wherein said predetermined exposure operation is started at a predetermined time interval after said first and second distance data have changed from each other, and thereafter is started at periodic intervals until said set number of pictures have been taken.

9. A self-photographing method as defined in claim 7, wherein said first and second distance data are detected for each picture, and each said predetermined exposure operation is started at a predetermined time interval after said first and second distance data have changed from each other.

10. A self-photographing method as defined in claim 7, wherein said first and second distance data are detected at least once for each exposure, and said predetermined exposure operation is started at a predetermined time interval after said first and second distance data have changed from each other, whereas said predetermined exposure operation for the second and following pictures is started at a predetermined time interval after said second distance data have changed twice from said first distance datum.

11. A self-photographing method for a camera as defined in claim 1, wherein the camera has a single-beam mode for projecting a single beam toward a subject point on the subject whose distance is to be measured and a multi-beam mode for projecting a plurality of beams toward a plurality of subject points on the subject whose distance is to be measured, said method further comprising the steps of:
    setting in the camera one of said single- and multi-beam modes;
    determining whether said single- or multi-beam mode is selected;
    actuating a switch means on the camera thereby to start a self-photographing operation;
    measuring a subject distance at the beginning of said self-photographing operation in the set one of said beam modes;
    storing in the camera at least a first distance datum corresponding to said subject distance;
    measuring again at least one subject distance after storing said first distance datum;
    detecting at least one second distance datum corresponding to said again measured subject distance;
    comparing said first and second distance data to determine whether said first and second distance data differ from each other; and
    executing a predetermined exposure operation when said first and second distance data differ from each other.

12. A self-photographing method as defined in claim 11, wherein said first and second distance data are detected for each of said plurality of subject points in said multi-beam mode, each said second distance datum being compared with a corresponding one of said first distance data.

13. A self-photographing method as defined in claim 12, wherein said second distance data are sequentially detected and each is compared with said corresponding first distance datum each time a said second datum is detected, and said predetermined exposure operation is executed when any of said corresponding first and second distance data differ from each other.

14. A self-photographing method as defined in claim 13, further comprising the step of
terminating said self-photographing operation before said predetermined exposure operation when said second distance data have been equal to said first distance datum throughout a predetermined time interval.

15. A self-photographing method as defined in claim 13, wherein said predetermined exposure operation is executed also when said second distance data have been equal to said first distance datum throughout a predetermined time interval.

16. A self-photographing method as defined in claim 14, wherein said predetermined exposure operation is executed only when a said second distance datum represent a nearer distance than said first distance datum.

17. An improved self-photographing method for a camera having a plurality of operating modes, wherein the camera has an auto-focus system, a self-photographing mode, and an infinity photographing mode for setting the focus of said camera at infinity, said method comprising the steps of:
a) determining whether a self-photographing mode has been set;
b) determining whether said infinity photographing mode has been set;
c) releasing said infinity photographing mode when said self-photographing mode is set before starting a self-photographing operation upon actuation of switch means for initiating a self-photographing operation of the camera; and
d) releasing said infinity photographing mode when said infinity photographing mode is set after starting a self-photographing operation upon actuation of a switch means for initiating a self-photographing operation of the camera.

18. A self-photographing method for a camera with a plurality of self-photographing modes, comprising the steps of:
a) setting a self-photographing mode in the camera and setting the number of the pictures to be taken in said self-photographing mode;
b) actuating a switch means on the camera thereby initiating a self-photographing operation of the camera;
c) measuring a subject distance at the beginning of said operation and storing in the camera a first distance datum corresponding to said subject distance;
d) measuring successive second distance data of the same subject point as for the first distance datum at periodic intervals after storing said first distance datum;
e) comparing said successive second distance data with said first distance datum at periodic intervals until at least one of said successive second distance data differs from said first distance datum;
f) executing a first predetermined exposure operation of film in the camera a predetermined time interval after said first distance datum and said second distance data have differed from each other;
g) determining whether the set number of the pictures have been taken after each exposure operation and thereafter executing an exposure operation at periodic intervals until the set number of the pictures have been taken; and
h) terminating said self-photographing mode when said set number of the pictures have been taken.

19. A self-photographing method as defined in claim 18, further comprising the step of:
i) terminating said self-photographing operation before said predetermined exposure operation when said second distance data have been equal to said first distance datum throughout a predetermined time interval.

20. A self-photographing method as defined in claim 18, wherein said predetermined exposure operation is executed also when said second distance data have been equal to said first distance datum throughout a predetermined time interval.

21. A self-photographing method as defined in claim 18, wherein said first distance datum and said second distance data are measured for each exposure, and each said predetermined exposure operation is started at a predetermined time interval after said first distance datum and said second distance data have differed from each other.

22. A camera with a self-photographing mode, comprising:
means for setting a self-photographing mode in the camera;
switch means on the camera actuable to start a self-photographing operation of the camera;
means for measuring a subject distance at the beginning of said operation;
means for storing in the camera a first distance datum corresponding to said subject distance;
means for detecting second distance data of the same subject point as for the first distance datum at periodic intervals after storing said first distance datum;
means for comparing said first and second distance data to determine whether said distance data differ from each other;
means for executing an exposure operation of film in the camera when said first and second distance data differ from each other; and
means for terminating said self-photographing mode before said predetermined exposure operation when said second distance data have been equal to said first distance datum throughout a predetermined time interval.

23. A camera as defined in claim 22 further comprising means whereby said second distance data are detected and compared with said first distance datum at periodic intervals until a said second distance datum differs from said first distance datum.

24. A camera as defined in claim 23, further comprising means whereby said predetermined exposure operation is executed also when said second distance data have been equal to said first distance datum throughout a predetermined time interval.

25. A camera as defined in claim 23, further comprising means whereby said predetermined exposure operation is executed only when a said second distance datum represents a nearer distance than said first distance datum.

26. A camera as defined in claim 23, further comprising means whereby said predetermined exposure operation is started at a predetermined time interval after said second distance datum has changed from said first distance datum.

27. A camera as defined in claim 23, further comprising means whereby a third distance datum of the same subject point as for said first and second distance data is detected when said second distance datum has changed from said first distance datum, and whereby said predetermined exposure operation is started only when said third distance datum is not equal to said first distance datum.

28. A camera as defined in claim 22, further comprising
means for setting in the camera the number of the pictures to be taken in a self-photographing operation before starting said self-photographing operation; and
means for determining whether said set number of pictures have been taken after each exposure operation.

29. A camera as defined in claim 28, further comprising means whereby said predetermined exposure operation is started at a predetermined time interval after said first and second distance data have changed from each other, and thereafter is started at periodic intervals until said set number of pictures have been taken.

30. A camera as defined in claim 28, further comprising means whereby said first and second distance data are detected for each picture, and each said predetermined exposure operation is started at a predetermined time interval after said first and second distance data have changed from each other.

31. A camera as defined in claim 28, further comprising means whereby said first and second distance data are detected at least one for each exposure, and said predetermined exposure operation is started at a predetermined time interval after said first and second distance data have changed from each other, whereas said predetermined exposure operation for the second and following pictures is started at a predetermined time interval after said second distance data have changed twice from said first distance datum.

32. A camera as defined in claim 22, wherein the camera has a single-beam mode for projecting a single beam toward a subject point on the subject whose distance is to be measured and a multi-beam mode for projecting a plurality of beams toward a plurality of subject points on the subject whose distance is to be measured, and further comprising
means for setting in the camera one of said single- and multi-beam modes;
means for determining whether said single- or multi-beam mode is selected;
switch means on the camera actuable to start a self-photographing operation;
means for measuring a subject distance at the beginning of said self-photographing operation in the set one of said beam modes;
means for storing in the camera at least a first distance datum corresponding to said subject distance;
means for measuring again at least one subject distance after storing said first distance datum;
means for detecting at least one second distance datum corresponding to said again measured subject distance;
means for comparing said first and second distance data to determine whether said first and second distance data differ from each other; and
means for executing a predetermined exposure operation when said first and second distance data differ from each other.

33. A camera as defined in claim 32, further comprising means whereby said first and second distance data are detected for each of said plurality of subject points in said multi-beam mode, and whereby each said second distance datum is compared with a corresponding one of said first distance data.

34. A camera as defined in claim 33, further comprising means whereby said second distance data are sequentially detected and each is compared with said corresponding first distance datum each time a said second datum is detected, and whereby said predetermined exposure operation is executed when any of said corresponding first and second distance data differ from each other.

35. A camera as defined in claim 34, further comprising means for
terminating said self-photographing operation before said predetermined exposure operation when said second distance data have been equal to said first distance datum throughout a predetermined time interval.

36. A camera as defined in claim 34, further comprising means whereby said predetermined exposure operation is executed also when said second distance data have been equal to said first distance datum throughout a predetermined time interval.

37. A camera as defined in claim 35, further comprising means whereby said predetermined exposure operation is executed only when a said second distance datum represents a nearer distance than said first distance datum.

38. A camera having a plurality of operating modes, wherein the camera has an auto-focus system, a self-photographing mode, and an infinity photographing mode for setting the focus of said camera at infinity, comprising
a) means for determining whether a self-photographing mode has been set;
b) means for determining whether said infinity photographing mode has been set; and
c) means for releasing said infinity photographing mode when said self-photographing mode is set before starting a self-photographing operation upon actuation of switch means for initiating a self-photographing operation of the camera; and
d) means for releasing said infinity photographing mode when said infinity photographing mode is set after starting a self-photographing operation upon actuation of a switch means for initiating a self-photographing operation of the camera.

39. A camera with a plurality of self-photographing modes, comprising
a) means for setting a self-photographing mode in the camera and setting the number of the pictures to be taken in said self-photographing mode;
b) switch means on the camera actuable to initiate a self-photographing operation of the camera;

c) means for measuring a subject distance at the beginning of said operation and storing in the camera a first distance datum corresponding to said subject distance;

d) means for measuring successive second distance data of the same subject point as for the first distance datum at periodic intervals after storing said first distance datum;

e) means for comparing said successive second distance data with said first distance datum at periodic intervals until at least one of said successive second distance data differs from said first distance datum;

f) means for executing a first predetermined exposure operation of film in the camera a predetermined time interval after said first distance datum and said second distance data have differed from each other;

g) means for determining whether the set number of the pictures have been taken after each exposure operation and for thereafter executing an exposure operation at periodic intervals until the set number of the pictures have been taken; and h) means for terminating said self-photographing mode when said set number of the pictures have been taken.

40. A camera as defined in claim 39, further comprising, i) means for terminating said self-photographing operation before said predetermined exposure operation when said second distance data have been equal to said first distance datum throughout a predetermined time interval.

41. A camera as defined in claim 39, further comprising means whereby said predetermined exposure operation is executed also when said second distance data have been equal to said first distance datum throughout a predetermined time interval.

42. A camera as defined in claim 39, further comprising means whereby said first distance datum and said second distance data are measured for each exposure, and whereby each said predetermined exposure operation is started at a predetermined time interval after said first distance datum and said second distance data have differed from each other.

43. A self-photographing method for a camera with a self-photographing mode, comprising the steps of:

setting in the camera the number of pictures to be taken in a self-photographing operation before starting said self-photographing operation;

determining whether said set number of pictures have been taken after each exposure operation;

setting said self-photographing method in the camera;

actuating a switch means on the camera thereby to start a self-photographing operation of the camera;

measuring a subject distance at the beginning of said operation;

storing in the camera a first distance datum corresponding to said subject distance;

detecting second distance data of the same subject point as for the first distance datum at periodic intervals after storing said first distance datum;

comparing said first and second distance data to determine whether said distance data differ from each other;

executing an exposure operation of film in the camera when said first and second distance data differ from each other;

wherein said self-photographing mode is terminated before said predetermined exposure operation when said second distance data have been equal to said first distance datum throughout a predetermined time interval.

44. A camera with a self-photographing mode, comprising:

means for setting in the camera the number of pictures to be taken in a self-photographing operation before starting said self-photographing operation;

means for determining whether said set number of pictures have been taken after each exposure operation;

means for setting said self-photographing mode in the camera;

switch means on the camera actuable to start a self-photographing operation of the camera;

means for measuring a subject distance at the beginning of said operation;

means for storing in the camera a first distance datum corresponding to said subject distance;

means for detecting second distance data of the same subject point as for the first distance datum at periodic intervals after storing said first distance datum;

means for comparing said first and second distance data to determine whether said distance data differ from each other;

means for executing an exposure operation of film in the camera when said first and second distance data differ from each other; and means for terminating said self-photographing mode before said predetermined exposure operation when said second distance data have been equal to said first distance datum throughout a predetermined time interval.

* * * * *